(12) United States Patent
Aikoh

(10) Patent No.: US 10,386,708 B2
(45) Date of Patent: Aug. 20, 2019

(54) LIGHT SYNTHESIS APPARATUS AND LIGHT SEPARATION APPARATUS

(71) Applicant: SONY CORPORATION, Tokyo (JP)

(72) Inventor: Yoshihisa Aikoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/542,659

(22) PCT Filed: Nov. 17, 2015

(86) PCT No.: PCT/JP2015/005714
§ 371 (c)(1),
(2) Date: Jul. 11, 2017

(87) PCT Pub. No.: WO2016/116975
PCT Pub. Date: Jul. 28, 2016

(65) Prior Publication Data
US 2017/0374326 A1  Dec. 28, 2017

(30) Foreign Application Priority Data
Jan. 20, 2015  (JP) .................................. 2015-008402

(51) Int. Cl.
*G03B 21/20* (2006.01)
*F21V 7/22* (2018.01)
(Continued)

(52) U.S. Cl.
CPC ............ *G03B 21/2066* (2013.01); *F21V 7/22* (2013.01); *F21V 14/04* (2013.01); *F21V 14/06* (2013.01);
(Continued)

(58) Field of Classification Search
CPC ............ G03B 21/2033; G03B 21/2073; G03B 33/12; G03B 21/2066; G03B 21/2013;
(Continued)

(56) References Cited

U.S. PATENT DOCUMENTS 6,874,890 B2 * 4/2005 Haino .................. H04N 9/3105
348/757
8,459,803 B2 * 6/2013 Plut ...................... H04N 9/3147
353/30
(Continued)

FOREIGN PATENT DOCUMENTS

| JP | 2004-318304 A | 11/2004 |
|----|---------------|---------|
| JP | 2012-220844 A | 11/2012 |

(Continued)

OTHER PUBLICATIONS

International Search Report dated Feb. 2, 2016 in PCT/JP2015/005714 filed Nov. 17, 2015.

*Primary Examiner* — Bao-Luan Q Le
(74) *Attorney, Agent, or Firm* — Oblon, McClelland, Maier & Neustadt, L.L.P.

(57) ABSTRACT

A light source apparatus includes a first light source module and a second light source module. The first light source module emits first emission light. The second light source module includes a light source unit that generates second emission light, and a switch unit that switches a position of an emission optical axis of the second emission light generated by the light source unit between a first optical axis position for emitting synthetic light of the first emission light and the second emission light and a second optical axis position for separating the first emission light and the second emission light for emission.

14 Claims, 13 Drawing Sheets

(51) Int. Cl.
  *F21V 14/04* (2006.01)
  *F21V 14/06* (2006.01)
  *G03B 21/14* (2006.01)
  *H04N 9/31* (2006.01)
  *G03B 33/12* (2006.01)

(52) U.S. Cl.
  CPC ......... *G03B 21/14* (2013.01); *G03B 21/2033* (2013.01); *G03B 21/2073* (2013.01); *G03B 33/12* (2013.01); *H04N 9/31* (2013.01); *H04N 9/3161* (2013.01); *H04N 9/3164* (2013.01); *G09G 2300/026* (2013.01); *G09G 2310/0235* (2013.01)

(58) Field of Classification Search
  CPC .. G03B 21/204; G03B 21/206; H04N 9/3111; H04N 9/3161; H04N 9/3164; H04N 9/3167; G02B 26/008
  See application file for complete search history.

(56) References Cited

U.S. PATENT DOCUMENTS

| | | | |
|---|---|---|---|
| 8,646,920 B2* | 2/2014 | Plut | H04N 9/3147 353/30 |
| 8,651,667 B2* | 2/2014 | Katou | G02B 26/008 348/744 |
| 8,668,339 B2* | 3/2014 | Kabuki | G03B 21/2033 315/360 |
| 8,721,090 B2* | 5/2014 | Choi | G02B 27/0961 353/30 |
| 8,882,275 B2* | 11/2014 | Sugitani | G03B 21/2033 348/38 |
| 9,094,619 B2* | 7/2015 | Miyazaki | G02B 27/102 |
| 9,291,826 B2* | 3/2016 | Domm | G02B 27/1026 |
| 2011/0116050 A1* | 5/2011 | Katou | G02B 26/008 353/31 |
| 2012/0154766 A1* | 6/2012 | Choi | G02B 27/0961 353/94 |
| 2012/0262675 A1* | 10/2012 | Kabuki | G03B 21/2033 353/20 |
| 2012/0262676 A1* | 10/2012 | Sugitani | G03B 21/2033 353/20 |
| 2013/0083295 A1* | 4/2013 | Miyazaki | G02B 27/102 353/31 |

FOREIGN PATENT DOCUMENTS

| | | |
|---|---|---|
| JP | 2012-220845 A | 11/2012 |
| JP | 2014-238485 A | 12/2014 |
| WO | 2010/018623 A1 | 2/2010 |

* cited by examiner

LIGHT SYNTHESIS APPARATUS AND LIGHT SEPARATION APPARATUS

TECHNICAL FIELD

The present technology relates to an image display apparatus such as a projector, a light source apparatus applicable to the image display apparatus, and a light source module.

BACKGROUND ART

From the past, image display apparatuses such as a projector are in wide use. For example, an image is displayed by modulating light from a light source by a light modulation device such as a liquid crystal device and projecting the modulated light onto a screen or the like. A mercury lamp, a xenon lamp, an LED (Light Emitting Diode), and LD (Laser Diode), and the like are used as the light source, for example. Of those, solid-state light sources such as an LED and an LD have advantages that since they have long lifetimes, lamp exchanges as in the past are unnecessary, and that they light up immediately after power is turned on.

For example, Patent Literature 1 describes an image display apparatus including a light source apparatus that emits white light and an image generation system that generates a color image on the basis of the white light. In the light source apparatus, blue laser light is irradiated onto a phosphor, and yellow fluorescence is generated due to excitation. White light is generated as this yellow light and blue laser light that is transmitted through the phosphor are synthesized. In the image generation system, white light is separated into light of 3 colors of RGB, and light is modulated for each color. A color image is generated by synthesizing the modulated light of the respective colors of RGB by a dichroic prism (paragraphs [0046]-[0050] [0123]-[0127], FIGS. 5 and 17, etc. of Patent Literature 1).

CITATION LIST

Patent Literature

Patent Literature 1: Japanese Patent Application Laid-open No. 2014-238485

DISCLOSURE OF INVENTION

Technical Problem

Projectors that use the laser light source as described above are considered to further prevail in the future, and development of an image generation system to be arranged inside the projector is also considered to progress. For example, as the image generation system, a system including a configuration different from the configuration described above that generates an image on the basis of white light may be developed. A technology that can flexibly cope with such a development is being demanded.

In view of the circumstances as described above, the present technology aims at providing a light source apparatus capable of flexibly coping with a configuration of an image generation system, an image display apparatus that uses the light source apparatus, and a light source module.

Solution to Problem

To attain the object described above, a light source apparatus according to an embodiment of the present technology includes a first light source module and a second light source module.

The first light source module emits first emission light.

The second light source module includes a light source unit that generates second emission light, and a switch unit that switches a position of an emission optical axis of the second emission light generated by the light source unit between a first optical axis position for emitting synthetic light of the first emission light and the second emission light and a second optical axis position for separating the first emission light and the second emission light for emission.

Two light source modules are provided in this light source apparatus. Of those, the second light source module is capable of switching the optical axis position of the second emission light between the first optical axis position for emitting synthetic light and the second optical axis position for separation emission. Therefore, it becomes possible to flexibly cope with a configuration of an image generation system.

The first emission light may include a first wavelength range. In this case, the second emission light may include a second wavelength range different from the first wavelength range and may be light from which white light is generated when synthesized with the first emission light.

Accordingly, it becomes possible to appropriately make a switch between a mode for emitting white light and a separation emission mode.

The switch unit may include a first mirror that reflects the second emission light generated by the light source unit and a switch mechanism that switches a reflection direction of the first mirror, and switch a position of the emission optical axis by switching the reflection direction of the first mirror.

Accordingly, the position of the emission optical axis can be switched with a simple configuration.

The first mirror may be arranged at the first optical axis position. In this case, the switch unit may include a second mirror that is arranged at the second optical axis position and reflects incident light in an emission direction of the second emission light. Further, the switch mechanism may switch the reflection direction of the first mirror between the emission direction of the second emission light and a direction directed toward the second mirror.

Accordingly, the position of the emission optical axis can be switched with a simple configuration.

In a case where the switch unit is a first switch unit, the first light source module may include a second switch unit that switches a position of an emission optical axis of the first emission light between the first optical axis position and a third optical axis position for separating the first emission light and the second emission light for emission.

Accordingly, it becomes possible to flexibly cope with the configuration of the image generation system.

The first light source module may include an outlet that is arranged at the third optical axis position and from which the first emission light is emitted. In this case, the second switch unit may include an optical axis changing member detachably arranged in front of the outlet and switch the position of the emission optical axis by making a switch between attaching and detaching the optical axis changing member, the optical axis changing member emitting the first emission light emitted from the outlet in an emission direction of the first emission light from the first optical axis position.

Accordingly, the position of the emission optical axis can be switched with a simple configuration.

The second switch unit may include an optical axis movement mechanism that moves the position of the emission optical axis of the first emission light between the first optical axis position and the third optical axis position.

Accordingly, the position of the emission optical axis can be switched with a simple configuration.

The light source unit may include an emission lens that emits the second emission light. In this case, the second switch unit may cause the first emission light to enter the emission lens in a case where the position of the first emission optical axis is to be moved to the first optical axis position.

Accordingly, it becomes possible to use the emission lens of the second light source module as an emission lens that emits synthetic light and suppress component costs.

An image display apparatus according to an embodiment of the present technology includes the light source apparatus, an image generation system that generates an image on the basis of the synthetic light emitted from the light source apparatus, and a projection system that projects the image generated by the image generation system.

An image display apparatus according to another embodiment of the present technology includes the light source apparatus, an image generation system that generates an image on the basis of the first emission light and the second emission light that have been separated and emitted from the light source apparatus, and the projection system.

A light source module according to an embodiment of the present technology includes a light source unit, a mirror, and a switch unit.

The light source unit generates light.

The mirror reflects the light generated by the light source unit.

The switch unit switches, by switching a reflection direction of the mirror, a position of an emission optical axis of the light generated by the light source unit between a synthetic optical axis position for emitting synthetic light synthesized with another light emitted from another light source module and a separation optical axis position for separating the light from the another light for emission.

A light source module according to another embodiment of the present technology includes an outlet and a switch unit.

The outlet is arranged at a separation optical axis position for separating light from another light emitted from another light source module for emission, and emits the light in an emission direction.

The switch unit includes an optical axis changing member detachably arranged in front of the outlet and switches a position of an emission optical axis of the light emitted from the outlet by making a switch between attaching and detaching the optical axis changing member, the optical axis changing member emitting the light emitted from the outlet in the emission direction from a synthetic optical axis position for emitting synthetic light synthesized with the another light.

A light source module according to another embodiment of the present technology includes an outlet and an optical axis movement mechanism.

Light is emitted from the outlet.

The optical axis movement mechanism moves a position of an emission optical axis of the light between a separation optical axis position for separating the light from another light emitted from another light source module for emission and a synthetic optical axis position for emitting synthetic light synthesized with the another light.

Advantageous Effects of Invention

As described above, according to the present technology, it becomes possible to flexibly cope with the configuration of the image generation system. It should be noted that the effects described herein are not necessarily limited, and any effect described in the present disclosure may be obtained.

MODES FOR CARRYING OUT THE INVENTION

Hereinafter, an embodiment of the present technology will be described with reference to the drawings.

[Image Display Apparatus]

Figure 1:
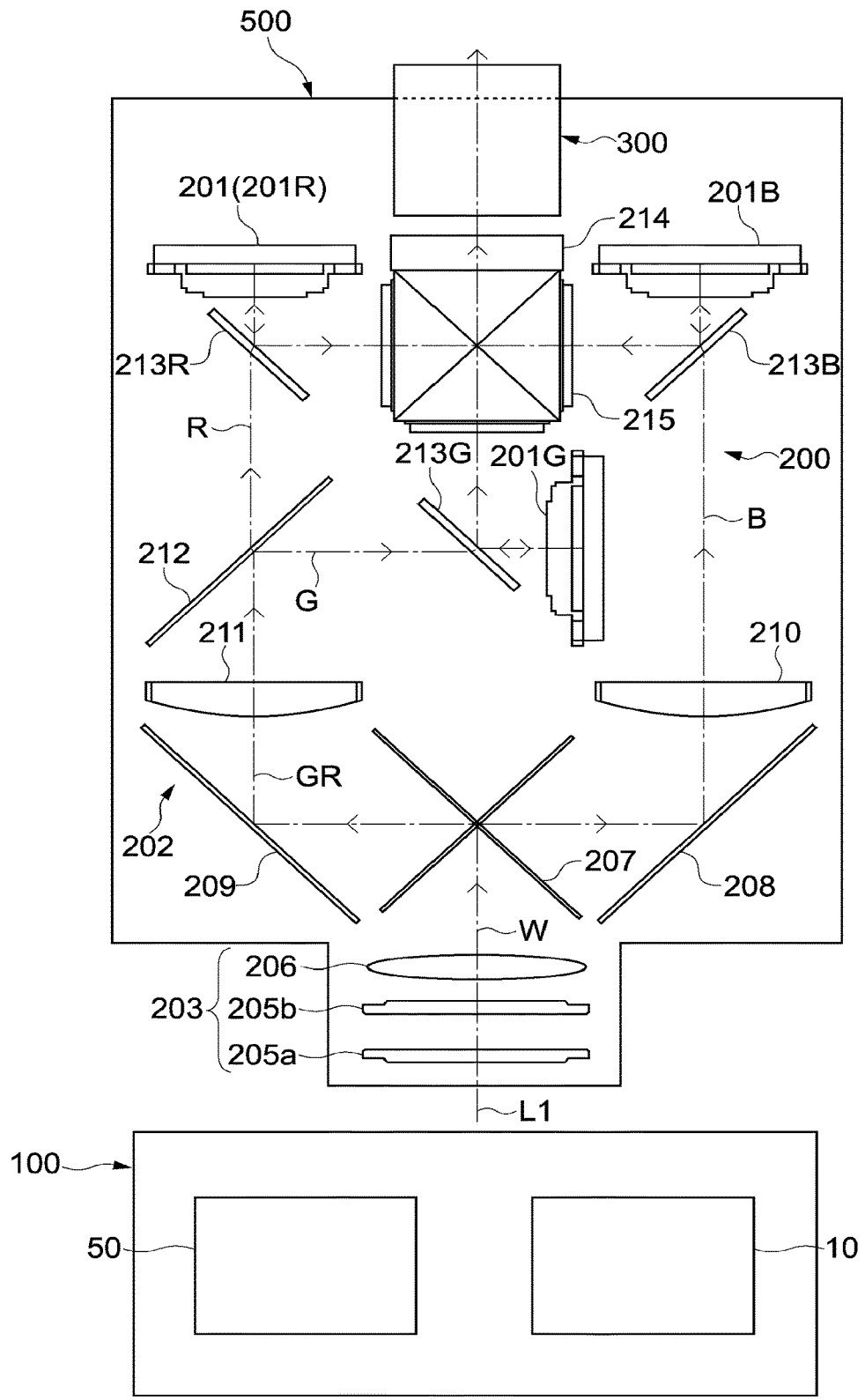
FIG. 1 A schematic diagram showing a configuration example of an image display apparatus according to an embodiment of the present technology.
Figure 2:
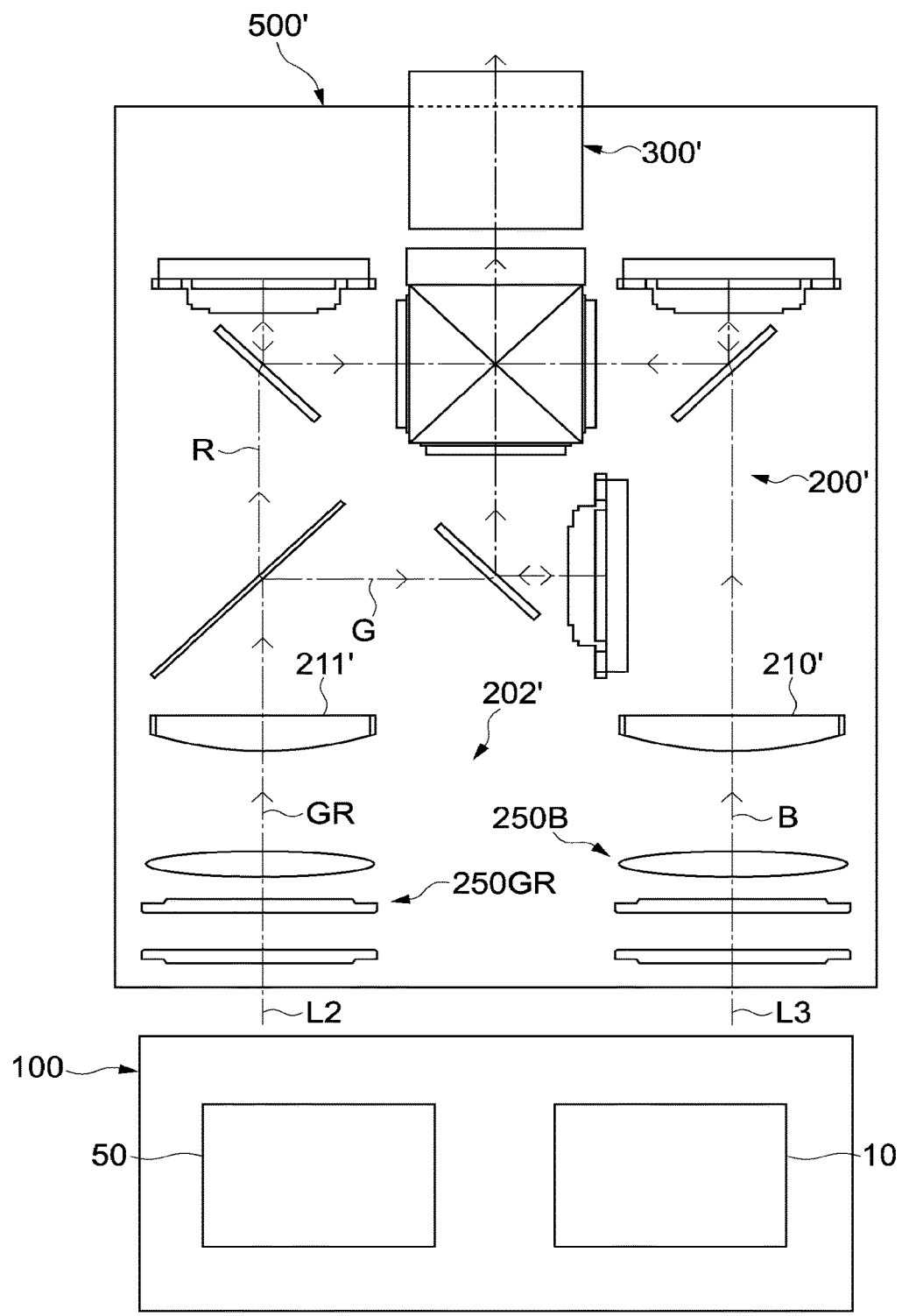
FIG. 2 A schematic diagram showing another configuration example of the image display apparatus according to the embodiment of the present technology.

FIGS. 1 and 2 are schematic diagrams showing different configuration examples of an image display apparatus according to an embodiment of the present technology. These image display apparatuses are used as a projector for presentations or a projector for digital cinema, for example. The present technology described below is also applicable to image display apparatuses used for other purposes.

Image display apparatuses 500 and 500' respectively shown in FIGS. 1 and 2 each include a light source apparatus 100 according to the present technology. The light source apparatus 100 includes a B light source module 10 that emits blue light having a blue wavelength range and a GR light source module 50 that emits light having a wavelength range ranging from a red wavelength range to a green wavelength range (i.e., yellow light).

In the example shown in FIG. 1, white light W is emitted from the light source apparatus 100 along an optical axis L1. The white light W is synthetic light obtained by synthesizing blue light from the B light source module 10 and yellow light from the GR light source module 50. On the other hand, in the example shown in FIG. 2, yellow light GR from the GR light source module 50 is emitted from the light source apparatus 100 along an optical axis L2. Moreover, blue light B from the B light source module 10 is emitted along an optical axis L3.

In other words, the light source apparatus 100 is capable of making a switch between a synthetic light emission mode for emitting white light W along the optical axis L1 and a separation emission mode for separately emitting yellow light GR and blue light B respectively along the optical axis L2 and the optical axis L3.

It should be noted that in this embodiment, the B light source module 10 corresponds to a first light source module. Further, the blue light B corresponds to first emission light including a first wavelength range. Moreover, in this embodiment, the GR light source module 50 corresponds to a second light source module. Furthermore, the yellow light GR corresponds to second emission light that includes a second wavelength range different from the first wavelength range and from which white light W is generated when synthesized with the first emission light. It should be noted that light of other colors may be emitted as the light having first and second wavelength ranges.

Further, positions of the optical axes L1, L2, and L3 respectively correspond to a first optical axis position for emitting synthetic light of the blue light B and the yellow light GR, a second optical axis position for separating and emitting the blue light B and the yellow light GR, and a third optical axis position for separating and emitting the blue light B and the yellow light GR. Furthermore, the position of the optical axis L1 corresponds to a synthetic optical axis position for emitting synthetic light synthesized with another light emitted from another light source module, and the positions of the optical axes L2 and L3 each correspond to a separation optical axis position for separating light from the another light emitted from the another light source module for emission.

The light source apparatus 100 and the B light source module 10 and GR light source module 50 provided therein will be described later in detail.

The image display apparatus 500 shown in FIG. 1 includes the light source apparatus 100 set in a synthetic light emission mode, an image generation system 200 that generates an image on the basis of white light W emitted from the light source apparatus 100, and a projection system 300 that projects an image generated by the image generation system 200 onto a screen (not shown) or the like.

The image generation system 200 includes a plurality of reflection-type liquid crystal lightbulbs (image generation devices) 201, an illumination optical system 202 that guides light to each of the liquid crystal lightbulbs 201, and a dichroic prism 214.

As shown in FIG. 1, the illumination optical system 202 includes an integrator optical system 203, a first dichroic mirror 207, two reflective mirrors 208 and 209, two collective lenses 210 and 211, a second dichroic mirror 212, and reflection-type polarization devices 213R, 213G, and 213B.

The integrator optical system 203 includes a first fly-eye lens 205a, a second fly-eye lens 205b, and a condenser lens 206. The first and second fly-eye lenses 205a and 205b each include a plurality of micro-lenses that are arranged two-dimensionally, and the micro-lenses are arranged so as to have a one-on-one relationship. By the first and second fly-eye lenses 205a and 205b, a luminance distribution of white light W irradiated onto the condenser lens 206 is uniformized.

The first dichroic mirror 207 splits the white light W emitted from the condenser lens 206 into blue light B on a short wavelength side and yellow light GR on a long wavelength side. The blue light B split by the first dichroic mirror 207 is reflected by the first reflective mirror 208 and enters the first collective lens 210. Further, the blue light B collected by the first collective lens 210 enters the liquid crystal lightbulb 201B via the reflection-type polarization device 213B.

The yellow light GR split by the first dichroic mirror 207 is reflected by the second reflective mirror 209 and enters the second collective lens 211. Then, the yellow light GR collected by the second collective lens 211 is emitted to the second dichroic mirror 212.

The second dichroic mirror 212 splits the yellow light GR into green light G on a short wavelength side and red light R on a long wavelength side. The split red light R enters the liquid crystal lightbulb 201R via the reflection-type polarization device 213R. The green light G enters the liquid crystal lightbulb 201G via the reflection-type polarization device 213G.

The liquid crystal lightbulbs 201R, 201G, and 201B are electrically connected to a signal source (e.g., PC etc.) (not shown) that supplies image signals including image information. The liquid crystal lightbulbs 201R, 201G, and 201B modulate and reflect incident light for each pixel on the basis of supplied image signals of the respective colors. The modulated 3 image light beams are reflected by the reflection-type polarization devices 213R, 213G, and 213B and enter the dichroic prism 214. At this time, polarization directions of the modulated light of the respective colors are aligned by polarization plates 215 provided in the dichroic prism 214. As a result, contrast is improved.

The dichroic prism 214 synthesizes the 3 light beams modulated by the liquid crystal lightbulbs 201R, 201G, and 201B on the same optical path and emits it toward the projection system 300. The projection system 300 includes a lens (not shown) and the like and irradiates the synthesized light onto a screen or the like while magnifying it by a predetermined magnification ratio. Accordingly, a full-color image is displayed.

The image display apparatus 500' shown in FIG. 2 includes the light source apparatus 100 set in a separation emission mode, an image generation system 200' that generates an image on the basis of blue light B and yellow light GR emitted from the light source apparatus 100, and a projection system 300'. Of those, a configuration of an illumination optical system 202' of the image generation system 200 differs from that of the illumination optical system 202 shown in FIG. 1, so that point will be described.

The illumination optical system 202' includes an integrator optical system 250B arranged on the optical axis L3 and an integrator optical system 250GR arranged on the optical axis L2. A luminance distribution of the blue light B emitted on the optical axis L3 is uniformized by the integrator optical system 250B, and the blue light B is emitted to a first collective lens 210'. Further, a luminance distribution of the yellow light GR emitted on the optical axis L2 is uniformized by the integrator optical system 250GR, and the yellow light GR is emitted to a second collective lens 211'.

Configurations subsequent to the first and second collective lenses 210' and 211' are equivalent to those of the image generation system 200 shown in FIG. 1. In other words, a full-color image is generated by the configurations and operations described with reference to FIG. 1 and displayed on a screen or the like by the projection system 300'.

[Light Source Apparatus]

Figure 3:
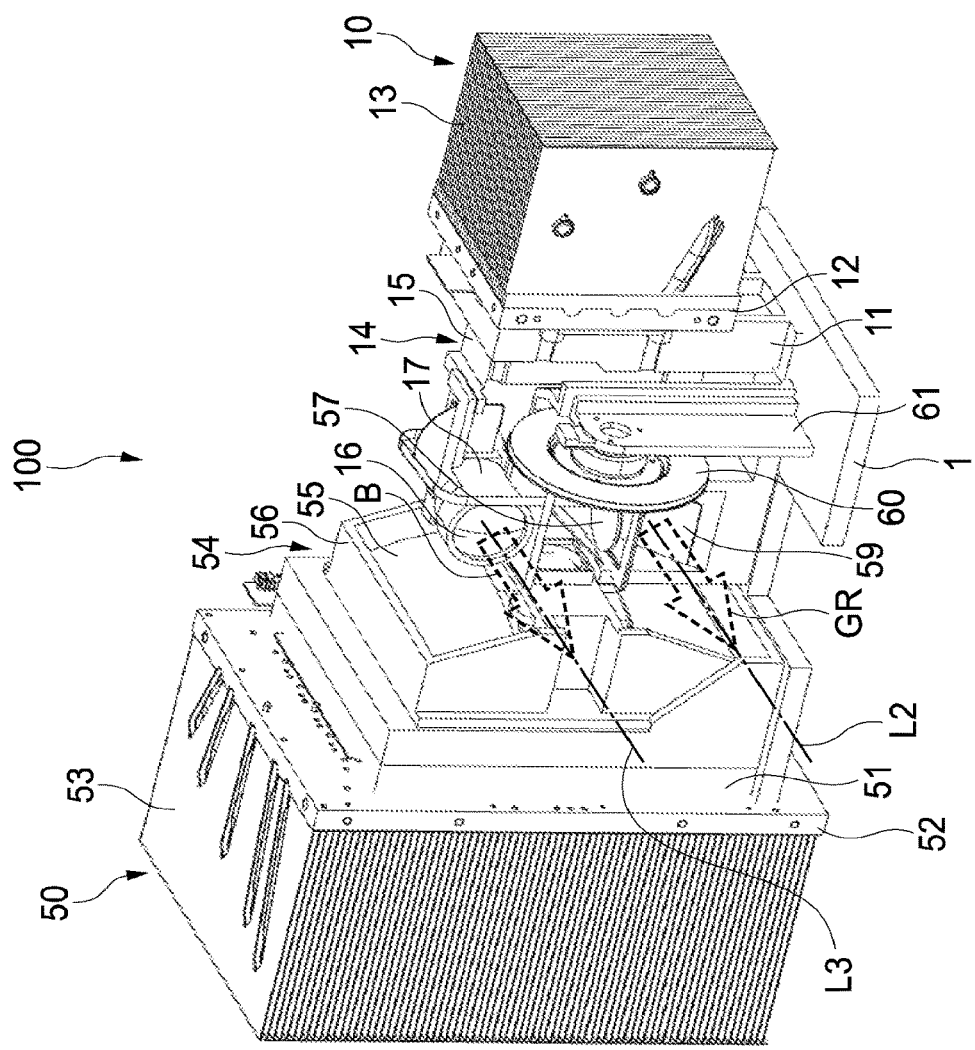
FIG. 3 A schematic diagram showing a configuration example of a GR light source module and a B light source module in a separation emission mode.
Figure 4:
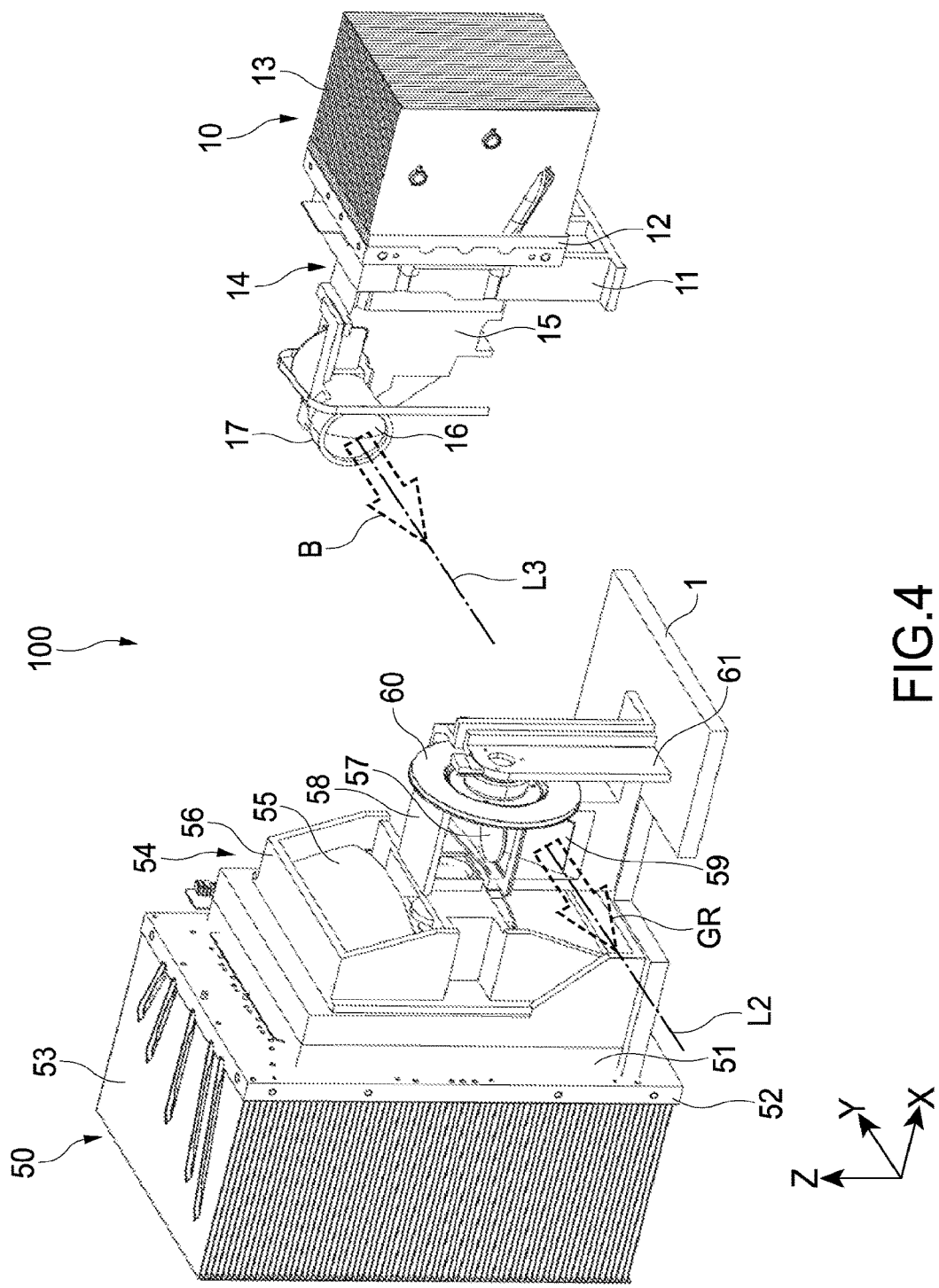
FIG. 4 A diagram showing a light source apparatus shown in FIG. 3 in a state where the B light source module is disengaged.

The configuration of the light source apparatus 100 in the separation emission mode will be described. FIG. 3 is a schematic diagram showing a configuration example of the GR light source module 50 and the B light source module 10. FIG. 4 is a diagram showing a state where the B light source module 10 is disengaged.

In descriptions below, with respect to coordinate axes in the figure, a Z-axis direction may be referred to as height direction (direction of arrow indicates upper side, and opposite direction indicates lower side), an X-axis direction may be referred to as lateral direction (direction of arrow indicates right-hand side, and opposite direction indicates left-hand side), and a Y-axis direction may be referred to as depth direction (direction of arrow indicates back side, and opposite direction indicates front side) for convenience.

It should be noted that an orientation of each of the light source modules, an emission direction of each of the light beams (optical axis direction), and the like are not limited and may be designed as appropriate. Further, the present technology is tilt-free supportable, and the orientation of each of the light source modules and the like are changed in accordance with an orientation in which the image display apparatuses 500 and 500' are used.

As shown in FIGS. 3 and 4, the GR light source module 50 and the B light source module 10 are each fixed to a base member 1. The base member 1 is a plate-like member that is arranged parallel to an XY plane direction. The GR light source module 50 and the B light source module 10 are mounted on and fixed to the base member 1. Accordingly, the light source apparatus 100 can be assembled with ease.

The GR light source module 50 includes a base portion 51, a light source holding portion 52, a heatsink 53, and an optical system holding portion 54. The base portion 51 is a member fixed to the base member 1 and is a frame member in which an opening (not shown) is formed at a center thereof.

On a back surface side (left-hand side of figure) of the base portion 51, the light source holding portion 52 is connected. The light source holding portion 52 is connected to the base portion 51 such that held light source blocks 63 (see FIG. 5 etc.) are positioned at the opening portion of the base portion 51. The heatsink 53 is connected on the back surface side of the light source holding portion 52. Accordingly, heat generated from the light source is cooled effectively.

The optical system holding portion 54 is connected on a front surface side (right-hand side of figure) of the base portion 51. The optical system holding portion 54 includes a mirror holding portion 56 that holds two aspheric mirrors 55, a lens holding portion 58 that holds an emission lens 57, an emission mirror 59, and a phosphor holding portion 61 that holds a phosphor wheel 60. The mirror holding portion 56 is connected to the base portion 51, and the lens holding portion 58 is connected to the mirror holding portion 56. The phosphor holding portion 61 is fixed onto the base member 1.

The B light source module 10 includes a base portion 11, a light source block 12, a heatsink 13, and an optical system holding portion 14. The base portion 11 is a frame member and is fixed onto the base member 1. The light source block 12 (see FIG. 5 etc.) is arranged on a back surface side (right-hand side of figure) of the base portion 11, and the heatsink 13 is connected to a back surface thereof.

The optical system holding portion 14 is connected to the front surface side (left-hand side of figure) of the base portion 11. The optical system holding portion 14 includes a casing portion 15 that accommodates an optical system therein and a lens holding portion 17 that holds an emission lens 16. The lens holding portion 17 is configured to be detachable from the casing portion 15.

As shown in FIG. 3, the GR light source module 50 and the B light source module 10 are arranged so as to oppose each other in the X-axis direction. The casing portion 15 of the B light source module 10 is arranged on a rear side (back side of figure) of the lens holding portion 58 and phosphor holding portion 61 of the GR light source module 50. Further, the lens holding portion 17 of the B light source module 10 is arranged on an upper side of the lens holding portion 58 of the GR light source module 50.

The yellow light GR is emitted from the emission lens 57 toward the emission mirror 59 arranged below the emission lens 57. Then, by being reflected by the emission mirror 59, the yellow light GR is emitted toward the front side along the optical axis L2. The blue light B is emitted from the emission lens 16 toward the front side along the optical axis L3. The optical axes L2 and L3 are provided so as to be parallel to each other at positions aligned in the Z-axis direction.

By arranging the GR light source module 50 and the B light source module 10 opposite to each other and arranging the optical axes L2 and L3 at substantially the center thereof, the light source apparatus 100 can be made compact. Of course, the configuration is not limited to that described herein.

Figure 5:
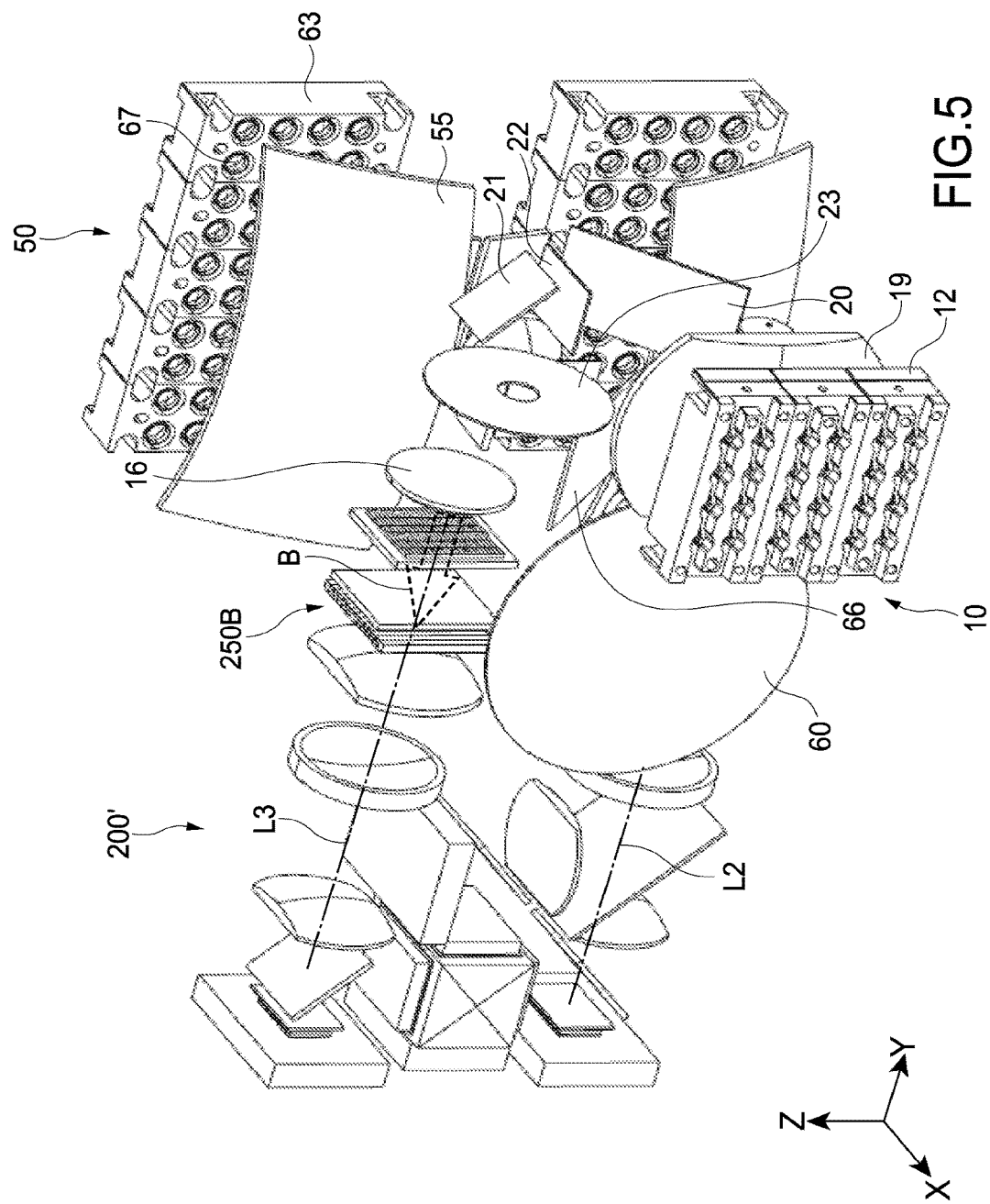
FIG. 5 A schematic diagram showing a configuration example of optical systems of an image generation system and the light source modules.
Figure 6:
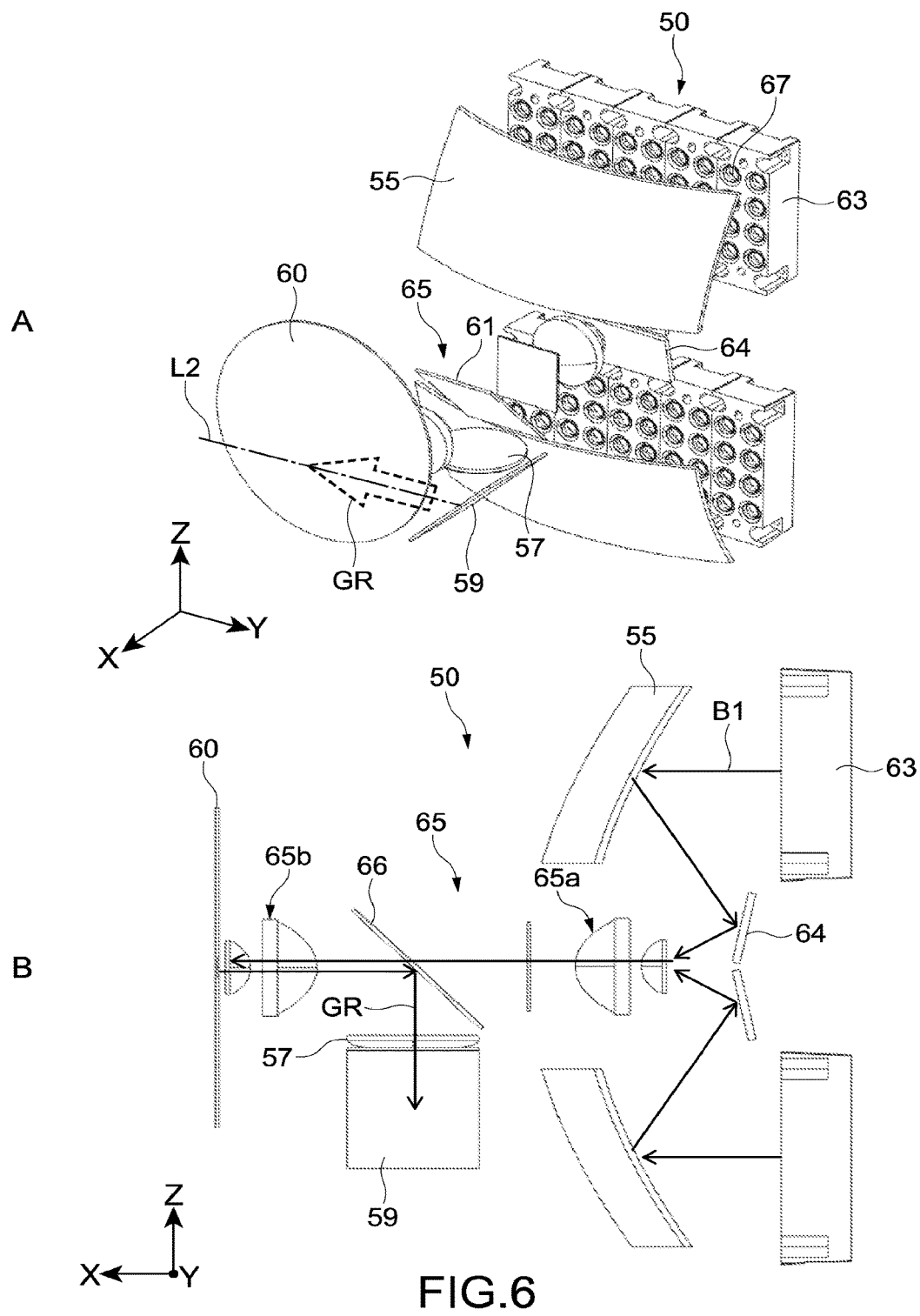
FIG. 6 Diagrams each showing a configuration example of the optical system of the GR light source module.
Figure 7:
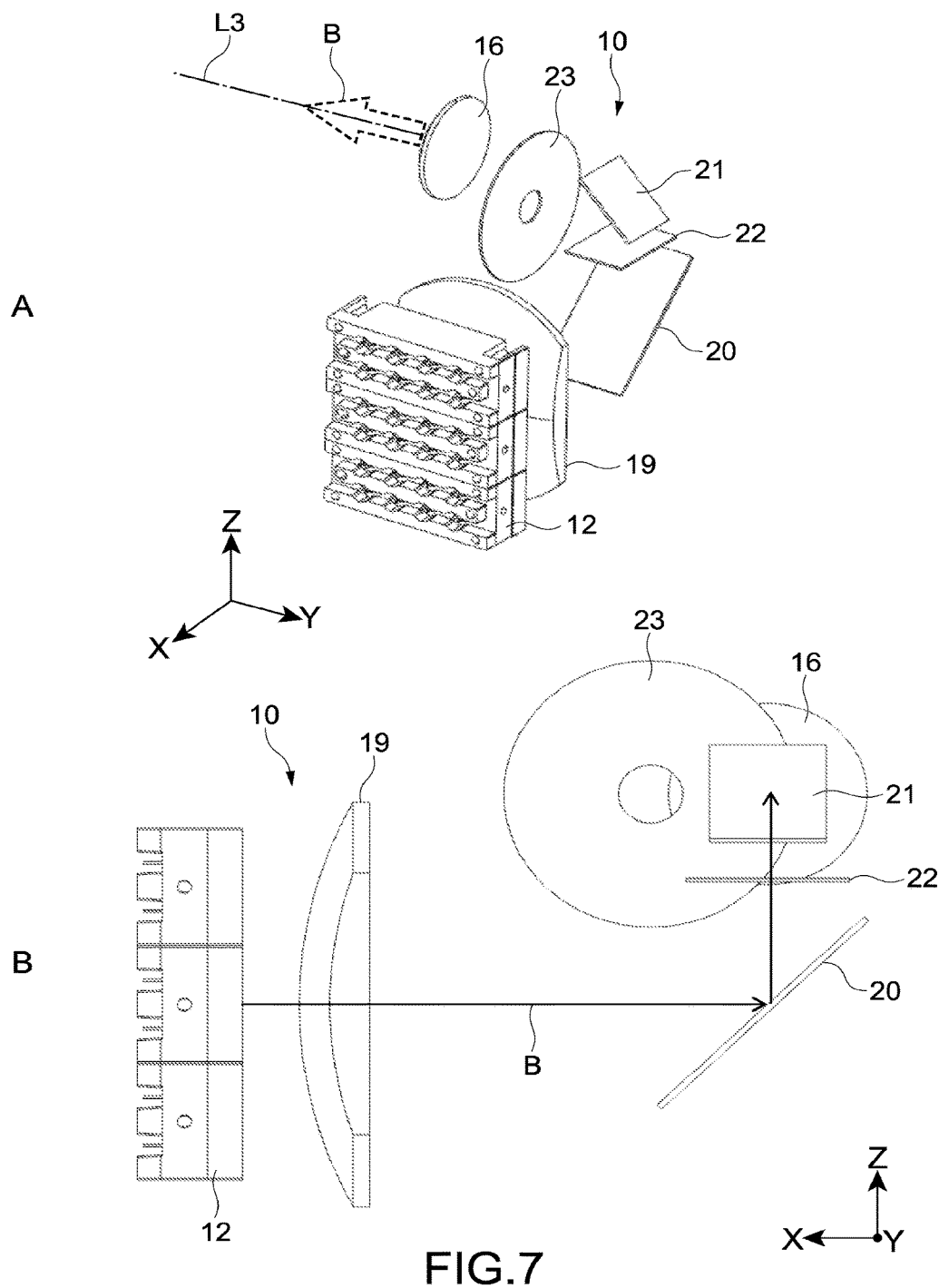
FIG. 7 Diagrams each showing a configuration example of the optical system of the B light source module.

The optical systems of the GR light source module 50 and the B light source module 10 will be described. FIG. 5 is a schematic diagram showing a configuration example of the optical system of each of the light source modules including the image generation system 200'. FIG. 6 are diagrams each showing a configuration example of the optical system of the GR light source module 50. FIG. 7 are diagrams each showing a configuration example of the optical system of the B light source module 10.

As shown in FIG. 5, blue light B is emitted toward the integrator optical system 250B for the blue light B along the optical axis L3. Moreover, although hidden by the phosphor wheel 60 in FIG. 5, yellow light GR is emitted toward the integrator optical system 250GR for the yellow light GR along the optical axis L2.

FIG. 6A is a perspective view of the optical system of the GR light source module 50 seen from an oblique direction, and FIG. 6B is a diagram seeing the optical system from the back side in the Y-axis direction. As shown in FIGS. 6A and 6B, the GR light source module 50 includes the two light source blocks 63, the two aspheric mirrors 55, two plane mirrors 64, a collective lens system 65, the phosphor wheel 60, a dichroic mirror 66, the emission lens 57, and the emission mirror 59.

The two light source blocks 63 are held by the light source holding portion 52 shown in FIG. 4 and the like and each include a plurality of laser light sources 67. In this embodiment, the plurality of laser light sources 67 are a blue laser light source capable of oscillating blue laser light B1 including an emission intensity peak wavelength within a wavelength rage of 400 nm to 500 nm, for example. Other solid-state light sources such as an LED may be used instead of the laser light sources. The present technology is also applicable to a case where other mercury lamps, xenon lamps, and the like are used.

The aspheric mirrors 55 are arranged in front of the light source blocks 63 and reflect and collect the blue laser light B1. The blue laser light B1 reflected by the aspheric mirrors 55 is reflected toward a gap between the two light source blocks 63. The two plane mirrors 64 reflect the blue laser light B1 reflected by the aspheric mirrors 55 in the X-axis direction. The reflected blue laser light B1 enters the collective lens system 65 arranged along the X-axis direction.

The collective lens system 65 includes a light-incident side lens group 65a that diffuses and parallelizes the collected blue laser light B1 and a light-emitting side lens group 65b that collects the parallelized blue laser light on a phosphor layer formed on the phosphor wheel 60. The light-incident side lens group 65a and the light-emitting side lens group 65b are aligned along the X-axis direction, and the phosphor wheel 60 is also aligned along the same direction.

The phosphor wheel 60 is a reflection-type phosphor wheel, and a phosphor layer including a fluorescent substance that emits fluorescence when excited by the blue laser light B1 is formed therein. By the excitation of this phosphor layer, the blue laser light B1 is converted to generate yellow light GR. The generated yellow light GR is reflected by the phosphor wheel 60, returns to the light-emitting side lens group 65b, and progresses along the X-axis direction. It should be noted that a YAG (yttrium aluminum garnet)-based phosphor is used as the fluorescent substance included in the phosphor layer.

The phosphor wheel 60 is rotationally driven by a motor (not shown) or the like. Accordingly, a position of a point where excitation light is collected relatively moves, and saturation, combustion, and the like of the phosphor are suppressed.

The dichroic mirror 66 is arranged between the light-incident side lens group 65a and the light-emitting side lens group 65b. The dichroic mirror 66 transmits the blue laser light B1 and reflects the yellow light GR downwardly toward the emission lens 57. The emission lens 57 emits the yellow light GR toward the emission mirror 59, and the emission mirror 59 reflects the yellow light GR along the optical axis L2.

Figure 8:
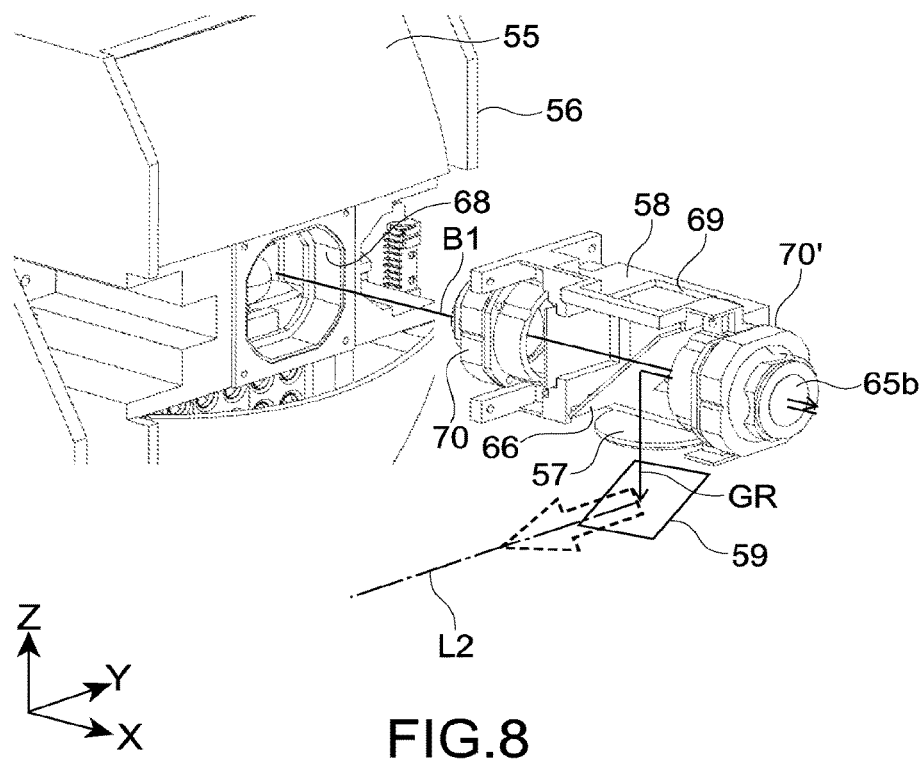
FIG. 8 A schematic diagram showing a specific configuration example of a mirror holding portion and a lens holding portion.

FIG. 8 is a schematic diagram showing a specific configuration example of the mirror holding portion 56 and the lens holding portion 58 that have been described with reference to FIG. 4. The mirror holding portion 56 holds the two aspheric mirrors 55 and the two plane mirrors 64. An attachment aperture 68 is formed at a portion substantially at the center of the mirror holding portion 56. The blue laser light B1 is reflected by the two plane mirrors 64 and emitted from the attachment aperture 68.

The lens holding portion 58 has a substantially cuboid shape and holds the light-incident side lens group 65a, the light-emitting side lens group 65b, the dichroic mirror 66, and the emission lens 57. The light-incident side lens group 65a and the light-emitting side lens group 65b are respectively provided at both end portions of the lens holding portion 58 in a long-axis direction. The dichroic mirror 66 and the emission lens 57 are arranged at a center portion of the lens holding portion 58. It should be noted that an opening 69 is formed at a position on the other side of the emission lens 57 at the center portion of the lens holding portion 58. The emission lens 57 and the opening 69 oppose each other while sandwiching the dichroic mirror 66.

The lens holding portion 58 is attached to the attachment aperture 68 of the mirror holding portion 56. As shown in FIG. 8, the attachment aperture 68 is substantially rectangular. On the other hand, at an end portion of the lens holding portion 58, an attachment portion 70 that has a shape substantially identical to that shape and engages with the attachment aperture 68 is formed. In the case of the separation emission mode, the lens holding portion 58 is attached to the attachment aperture 68 such that the emission lens 57 faces downward.

It should be noted that although descriptions will also be given later, it is also possible to attach the lens holding portion 58 to the attachment aperture 68 while rotating the lens holding portion 58 in a unit of substantially 90 degrees. Specifically, it is possible to set the orientation of the emission lens 57 in any of the 4 orientations of the front side, upper side, back side, and lower side and attach the lens holding portion 58 to the attachment aperture 68 in that state. Accordingly, the position and direction of the optical axis L2 of the yellow light GR can be changed easily. It should be noted that the change of the orientation of the lens holding portion 58 is not limited to the case of changing in the unit of substantially 90 degrees. By changing the shape of the attachment aperture 68 and the attachment portion 70, and the like as appropriate, the orientation can be changed by smaller angles.

Further, in the example shown in FIG. 8, an attachment portion 70' that is capable of engaging with the attachment aperture 68 is also provided at an end portion on the other side where the light-emitting side lens group 65b is provided. Therefore, in this embodiment, it is also possible to attach the end portion on the light-emitting side lens group 65b side to the attachment aperture 68. For example, by making the configurations of the light-incident side lens group 65a and the light-emitting side lens group 65b equivalent to each other so as to become applicable to both the light-incident side and the light-emitting side, it becomes possible to flexibly cope with the change of the position of the optical axis L2, and the like. Moreover, it also becomes possible to suppress component costs for the lens holding portion 58. It should be noted that the orientation of the dichroic mirror 66, and the like can also be changed with ease.

In this embodiment, the light source blocks 63, the aspheric mirrors 55, the plane mirrors 64, the collective lens system 65, and the phosphor wheel 60 function as a light source unit that generates yellow light GR. Further, the dichroic mirror 66 functions as a first mirror that reflects the yellow light GR generated by the light source unit. Further, the emission mirror 59 functions as a second mirror that is arranged at a second optical axis position and reflects incident light in an emission direction of the yellow light GR (optical axis direction of optical axis L2).

FIG. 7A is a perspective view of the optical system of the B light source module 10 seen from the oblique direction, and FIG. 7 is a diagram seeing the optical system from the back side in the Y-axis direction. As shown in FIGS. 7A and 7B, the B light source module 10 includes a light source block 12, a collective lens 19, two reflective mirrors 20 and 21, a diffuser plate 22, a rotation diffuser plate 23, and an emission lens 16.

The light source block 12 includes a plurality of laser light sources that emit blue light B (blue laser light). Laser light sources that are the same as the laser light sources 67 provided in the GR light source module 50 may be used as the laser light sources, or different laser light sources may be used instead.

The collective lens 19 is arranged in front of the light source block 12 and collects the blue light B on the reflective mirror 20. The reflective mirror 20 reflects the blue light B upwardly and causes it to enter the diffuser plate 22. The blue light B whose light flux diameter is widened by the diffuser plate 22 is reflected toward the front side by the reflective mirror 21.

The rotation diffuser plate 23 is rotationally driven by a motor (not shown) or the like. The blue light B enters the emission lens 16 via this rotation diffuser plate 23. Then, the blue light B is emitted along the optical axis L3 by the emission lens 16.

In this embodiment, the emission lens 16 becomes an outlet that is arranged at a third optical axis position and emits the blue light B. It should be noted that in this embodiment, the emission lens 57 of the GR light source module 50 and the emission lens 16 of the B light source module 10 have configurations substantially equivalent to each other. Therefore, the blue light B and yellow light GR are emitted in light fluxes having diameters substantially equivalent to each other. Accordingly, configurations of the integrator optical systems 250B and 250GR (e.g., effective range of fly-eye lens, etc.) shown in FIG. 2 can be made substantially equivalent to each other, and component costs and production costs can therefore be suppressed.

The configurations of the GR light source module 50 and B light source module 10 in the synthetic light emission mode will be described. As schematically shown in FIG. 1, in the synthetic light emission mode, the position of the emission optical axis of the yellow light GR emitted from the GR light source module 50 is switched from the position of the optical axis L2 to the position of the optical axis L1. Also in the B light source module 10, the position of the emission optical axis of the blue light B to be emitted is switched from the position of the optical axis L3 to the position of the optical axis L1. Accordingly, the yellow light GR and the blue light B are synthesized on the optical axis L1, and white light W is emitted along the optical axis L1.

Figure 9:
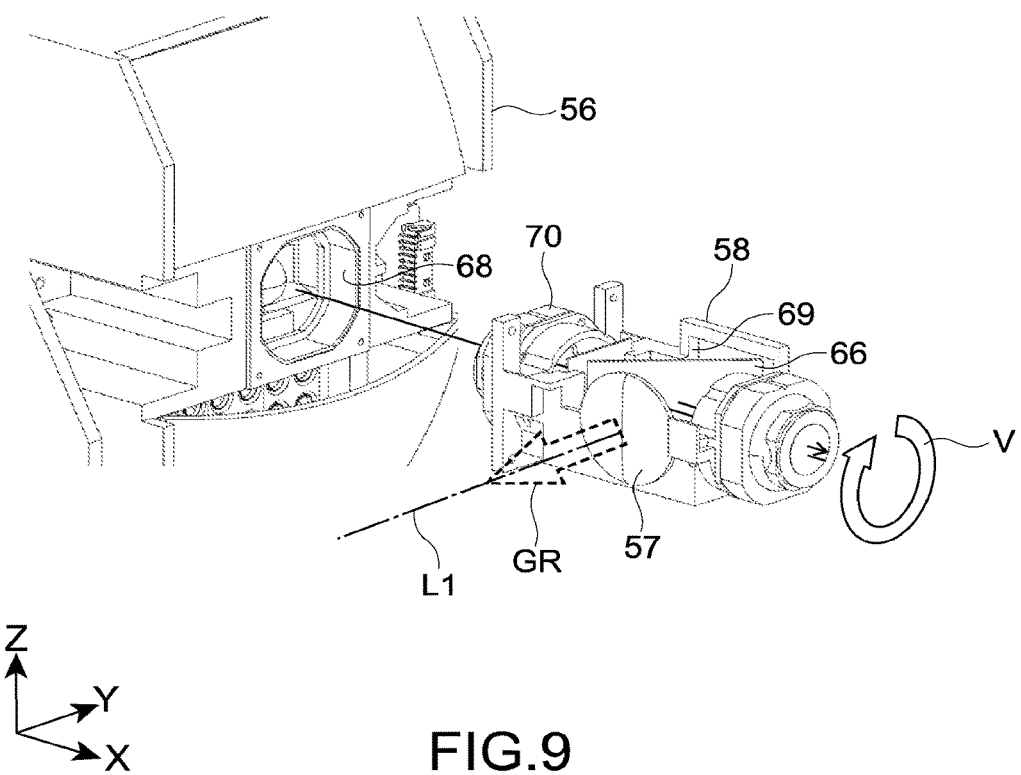
FIG. 9 A schematic diagram showing a configuration example of the GR light source module in a synthetic light emission mode.

FIG. 9 is a schematic diagram showing a configuration example of the GR light source module 30 in the synthetic light emission mode. As shown in FIG. 9, in the synthetic light emission mode, the lens holding portion 58 is attached to the attachment aperture 68 of the mirror holding portion 56 while being rotated substantially 90 degrees (see arrow V). Specifically, the lens holding portion 58 is attached to the attachment aperture 68 such that the emission lens 57 faces the front side. Accordingly, the yellow light GR is reflected toward the front side by the dichroic mirror 66 and emitted along the optical axis L1 for emitting white light W by the emission lens 77. It should be noted that the optical axis L1 is positioned above the optical axis L2.

In this way, in this embodiment, a reflection direction of the dichroic mirror 66 that reflects the yellow light GR generated by the phosphor layer can be switched by changing an attachment angle of the lens holding portion 58. In addition, by this switch of the reflection direction, the position of the emission optical axis of the yellow light GR is switched. With such a configuration, the position of the emission optical axis can be switched easily.

In this embodiment, a first switch unit that switches the position of the emission optical axis of the yellow light GR between the position of the optical axis L1 and the position of the optical axis L2 is realized by the mirror holding portion 56, the lens holding portion 58, and the optical systems held by these holding portions. In addition, by the mirror holding portion 56 and the lens holding portion 58 whose attachment angle can be changed, a switch mechanism that switches the reflection direction of the dichroic mirror 66 between the emission direction of the yellow light GR and a direction directed toward the emission mirror 59 is realized.

Figure 10:
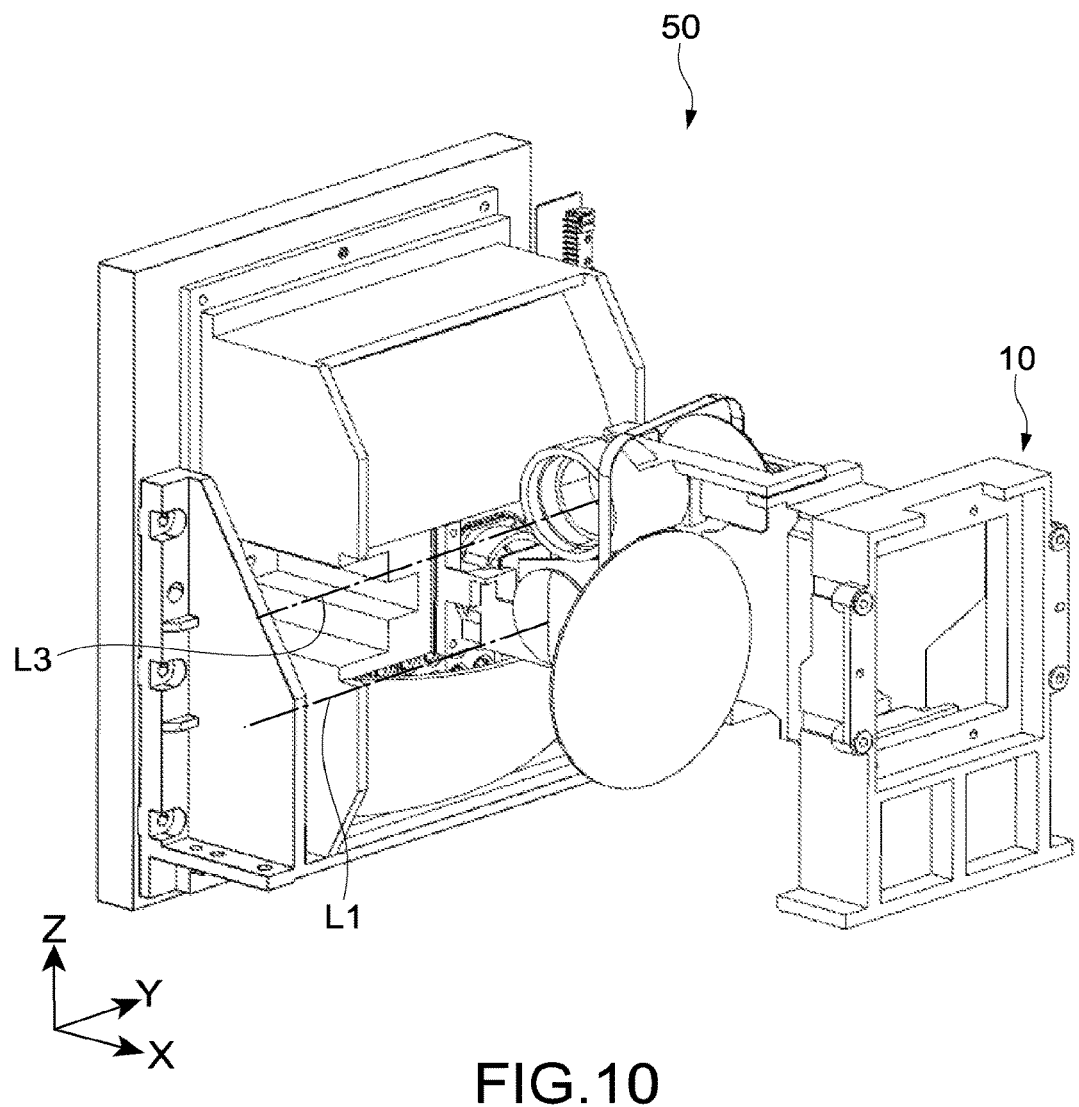
FIG. 10 A schematic diagram showing a state where only the GR light source module is in the synthetic light emission mode.

FIG. 10 is a schematic diagram showing a state where only the GR light source module 50 is switched to the synthetic light emission mode. As shown in FIG. 10, the optical axis L1 is positioned below the optical axis L3 for the blue light B in the separation emission mode. In the synthetic light emission mode, the position of the emission optical axis of the blue light B is switched from the position of the optical axis L3 to the position of the optical axis L1.

Figure 11:
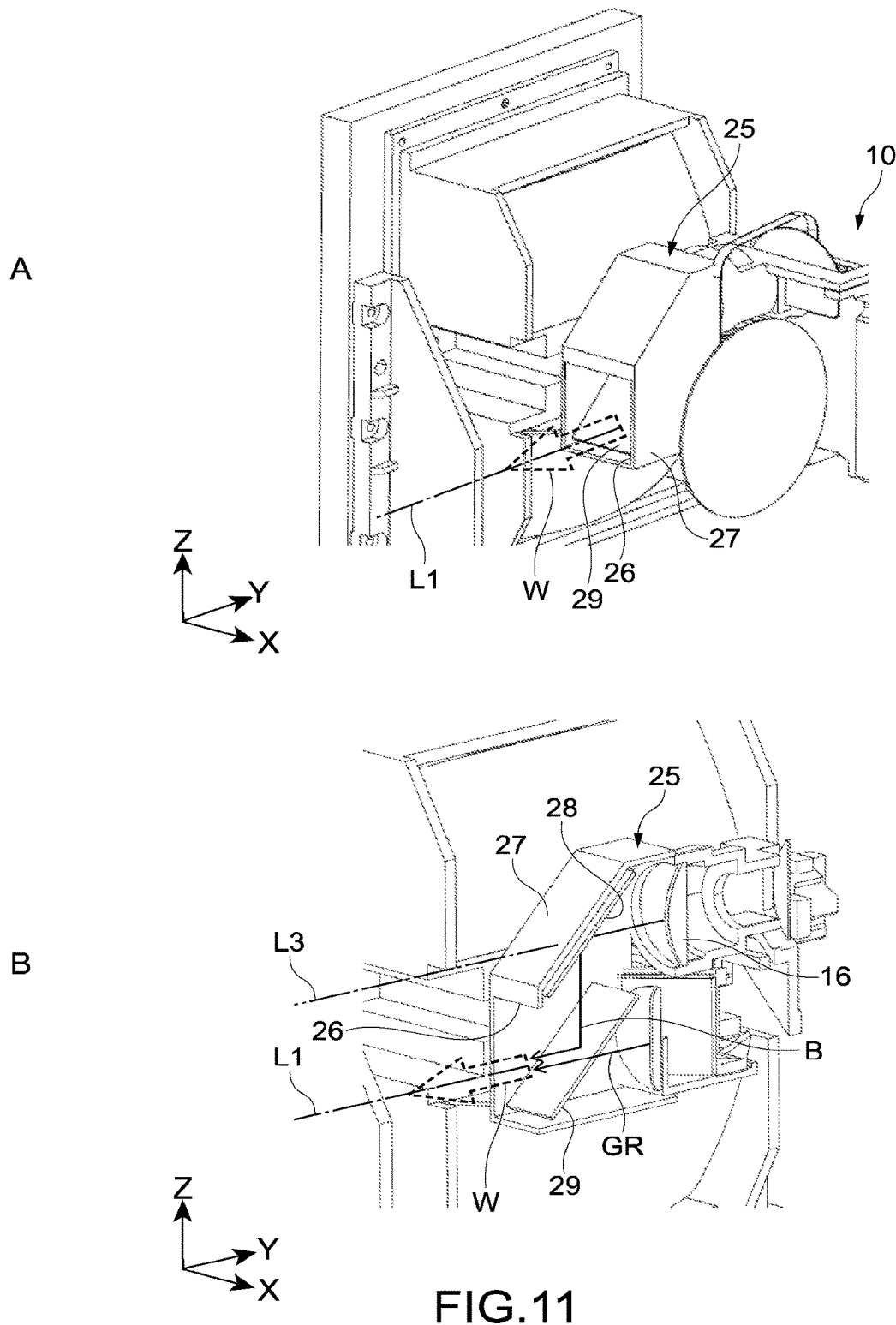
FIG. 11 Diagrams for explaining a configuration example of the B light source module in the synthetic light emission mode.

FIG. 11 are diagrams for explaining a configuration example of the B light source module 10 in the synthetic light emission mode, the diagrams being enlarged diagram of the portion that emits the blue light B. As shown in FIGS. 11A and 11B, in the synthetic light emission mode, an optical axis changing member 25 is detachably provided in front of the emission lens 16. The optical axis changing member 25 emits the blue light B emitted from the emission lens 16 in the emission direction of the blue light B from the position of the optical axis L1.

FIG. 11B is a schematic diagram showing an internal configuration example of the optical axis changing member 25. The optical axis changing member 25 includes a casing portion 27 including an emission aperture 26, a reflective mirror 28 arranged on the optical axis L3, and a dichroic mirror 29 arranged on the optical axis L1. The reflective mirror 28 and the dichroic mirror 29 are obliquely arranged on top and bottom surfaces of the casing portion 27, respectively.

The reflective mirror 28 reflects the blue light B emitted from the emission lens 16 along the optical axis L3 downwardly along the Z-axis direction. The dichroic mirror 29 transmits the yellow light GR along the optical axis direction of the optical axis L1. The dichroic mirror 29 also reflects the blue light B reflected by the reflective mirror 28 along the optical axis direction of the optical axis L1. Accordingly, the yellow light GR and the blue light B are synthesized on the optical axis L1, and white light W is emitted along the optical axis L1.

Therefore, in this embodiment, the position of the emission optical axis of the blue light B is switched by switching between attaching and detaching the optical axis changing member 25. In this embodiment, by the optical system holding portion 14, the optical system held by this, and the optical axis changing member 25 arranged detachably, a second switch unit that switches the position of the emission optical axis of the blue light B between the position of the optical axis L1 and the position of the optical axis L3 is realized. With such a configuration, the position of the emission optical axis can be switched easily.

Figure 12:
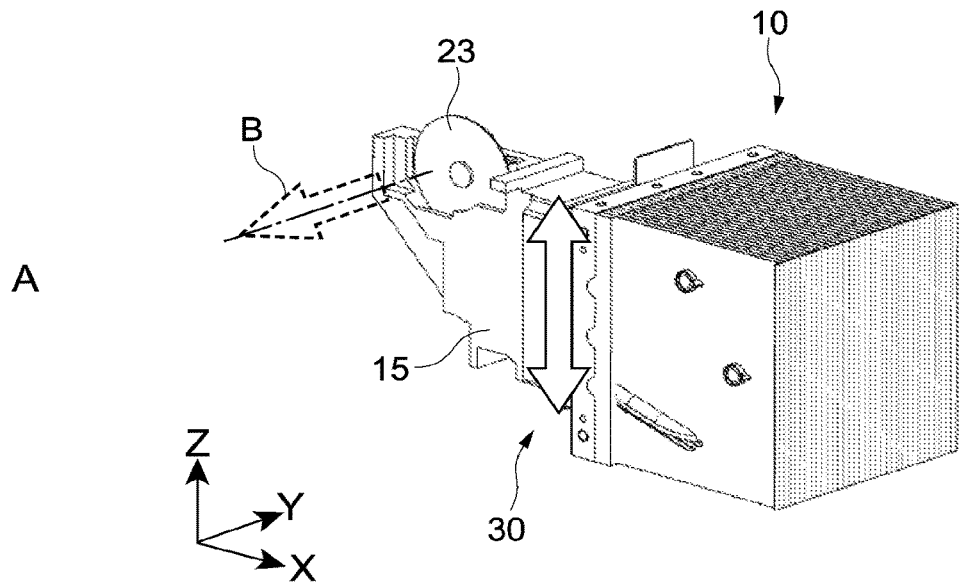
FIG. 12 Diagrams for explaining another configuration example of the B light source module in the synthetic light emission mode.
Figure 12:
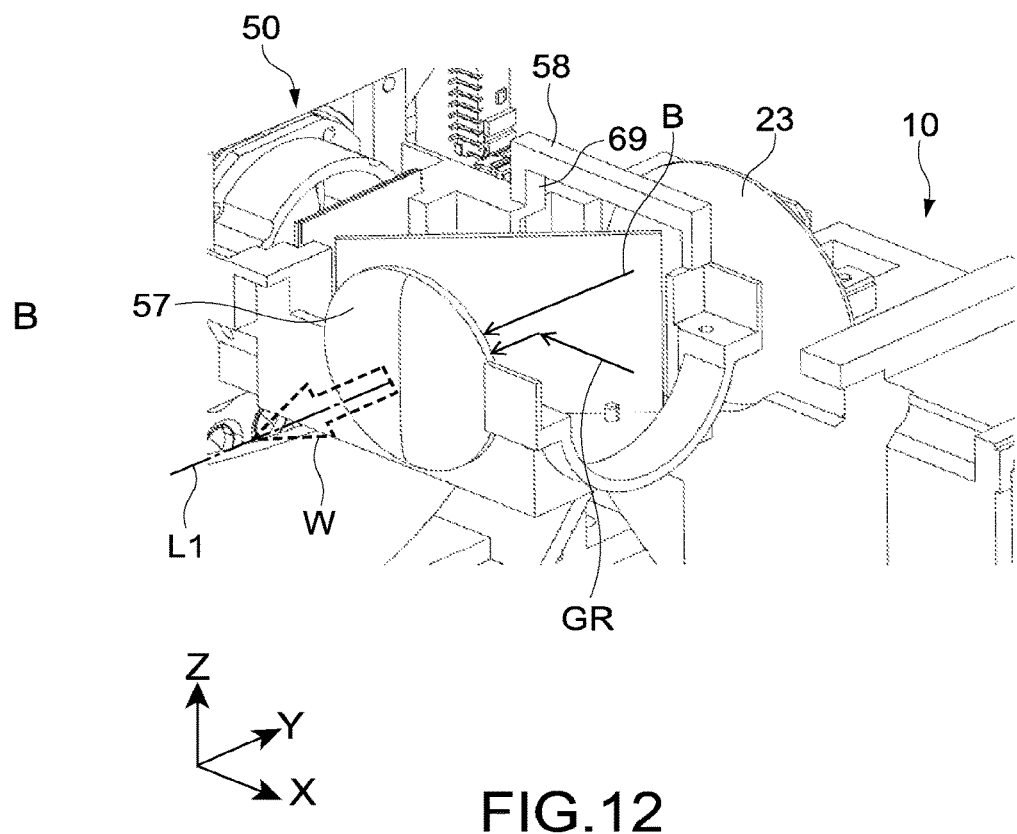

FIG. 12 are diagrams for explaining another configuration example of the B light source module 10 in the synthetic light emission mode. FIG. 12A is a diagram showing a configuration example of the B light source module 10 in the synthetic light emission mode. FIG. 12B is an enlarged diagram of a portion that emits white light W in a case where that B light source module 10 is incorporated.

In the example shown in FIG. 12, an optical axis movement mechanism 30 that enables the casing portion 15 accommodating the optical system inside to move in the Z-axis direction is configured. The optical axis movement mechanism 30 is configured by, for example, a rail groove formed on the base portion and the like, a stopper member for positioning, and the like. In addition, an arbitrary configuration for enabling the casing portion 15 to move may be adopted for realizing the optical axis movement mechanism 30.

As shown in FIG. 12A, in the case of switching to the synthetic light emission mode, the lens holding portion 17 holding the emission lens 16 is removed from the casing portion 15. Then, the casing portion 15 is moved downwardly by the optical axis movement mechanism 30. Accordingly, the position of the emission optical axis of the blue light B is moved from the position of the optical axis L3 to the position of the optical axis L1.

As shown in FIG. 12B, as the B light source module 10 is incorporated, the rotation diffuser plate 23 of the B light source module 10 is arranged right behind the opening 69 of the lens holding portion 58 of the GR light source module 50. Then, the blue light B emitted from the rotation diffuser plate 23 progresses on the optical axis L1 via the opening 69. Accordingly, the yellow light GR and the blue light B are synthesized on the optical axis L1, and white light W is emitted along the optical axis L1.

By configuring the optical axis movement mechanism 30 that moves the position of the emission optical axis of the blue light B between the position of the optical axis L1 and the position of the optical axis L3 in this way, the position of the emission optical axis can be switched easily. It should be noted that the optical axis movement mechanism 30 functions as the second switch unit.

Further, as shown in FIG. 12B, in the case of switching the optical axis of the blue light B to the optical axis L1, the blue light B enters the emission lens 57 of the GR light source module 50. Accordingly, the emission lens 57 of the GR light source module 50 can be used as an emission lens that emits white light W, and component costs can be suppressed. Further, it is possible to make the diameter of the light flux of the white light W to be substantially equivalent to that of the light flux of the yellow light GR and the blue light B in the separation emission mode. As a result, it becomes possible to make the configurations of the members in the image generation systems 200 and 200' shown in FIGS. 1 and 2 substantially equivalent and suppress component costs and production costs.

In the descriptions above, the two light source modules, that is, the GR light source module 50 and the B light source module 10, are provided in the light source apparatus 100 of this embodiment. Of those, the GR light source module 50 is capable of switching the optical axis position of the yellow light GR between the position of the optical axis L1 for emitting white light W and the position of the optical axis L2 for separation emission. Therefore, even if the configurations as exemplified in FIGS. 1 and 2 are selected as the image generation system as appropriate, it becomes possible to flexibly cope with that. Further, it is also possible to flexibly cope with a layout configuration of the image display apparatus, a set size restriction, a change in a luminance specification, and the like.

Further, the point that the blocks that respectively emit the yellow light GR and the blue light B are modularized like the GR light source module 50 and the B light source module 10 is also significantly advantageous in terms of flexibility with respect to the configurations of the image generation system and image display apparatus. For example, a desired configuration can easily be realized by appropriately setting the shape and arrangement orientation of each of the light source modules, the number to be arranged, and the like.

It should be noted that typically, the synthetic light emission mode and the separation emission mode are selected in advance and switched manually in accordance with the configuration of the image display apparatus to be produced or a desired purpose. However, without being limited to this, it is also possible to enable the synthetic light emission mode and the separation emission mode to be switched automatically in the produced image display apparatus. For example, it is also possible for the image generation system to include both the configuration of generating an image on the basis of white light W and the configuration of generating an image on the basis of separated yellow light GR and blue light B so that the emission mode of the light source apparatus 100 is switched as appropriate.

Further, one of the configurations shown in FIGS. 11 and 12 is typically selected as appropriate as the configuration of the B light source module 10 in the synthetic light emission mode. Specifically, both the detachment of the optical axis changing member 25 and the optical axis movement by the optical axis movement mechanism 30 can be realized, and a more appropriate method is selected in accordance with the configuration of the image generation system and the like. However, a configuration capable of realizing only one of the configurations shown in FIGS. 11 and 12 may be used, and sufficient effects can be exerted also in this case.

Other Embodiments

The present technology is not limited to the embodiment described above, and various other embodiments can also be realized.

Figure 13:
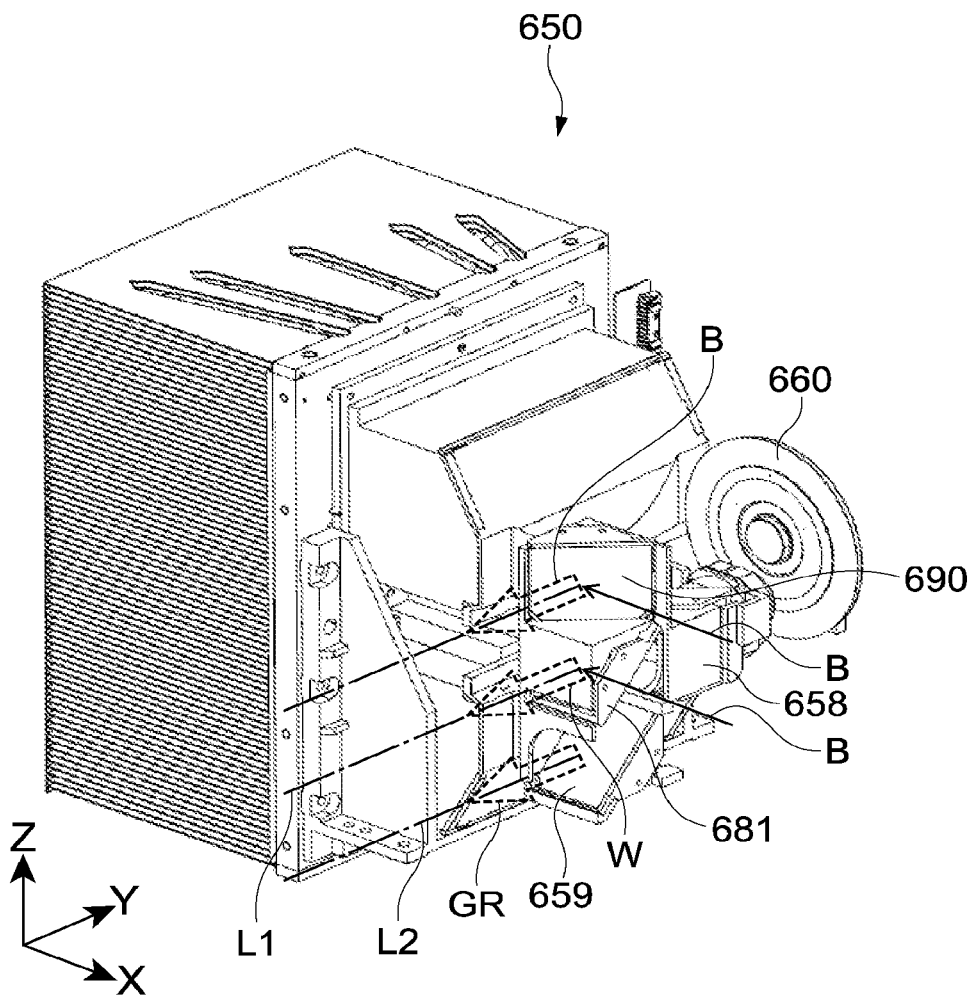
FIG. 13 A schematic diagram showing another configuration example of the GR light source module.
Figure 14:
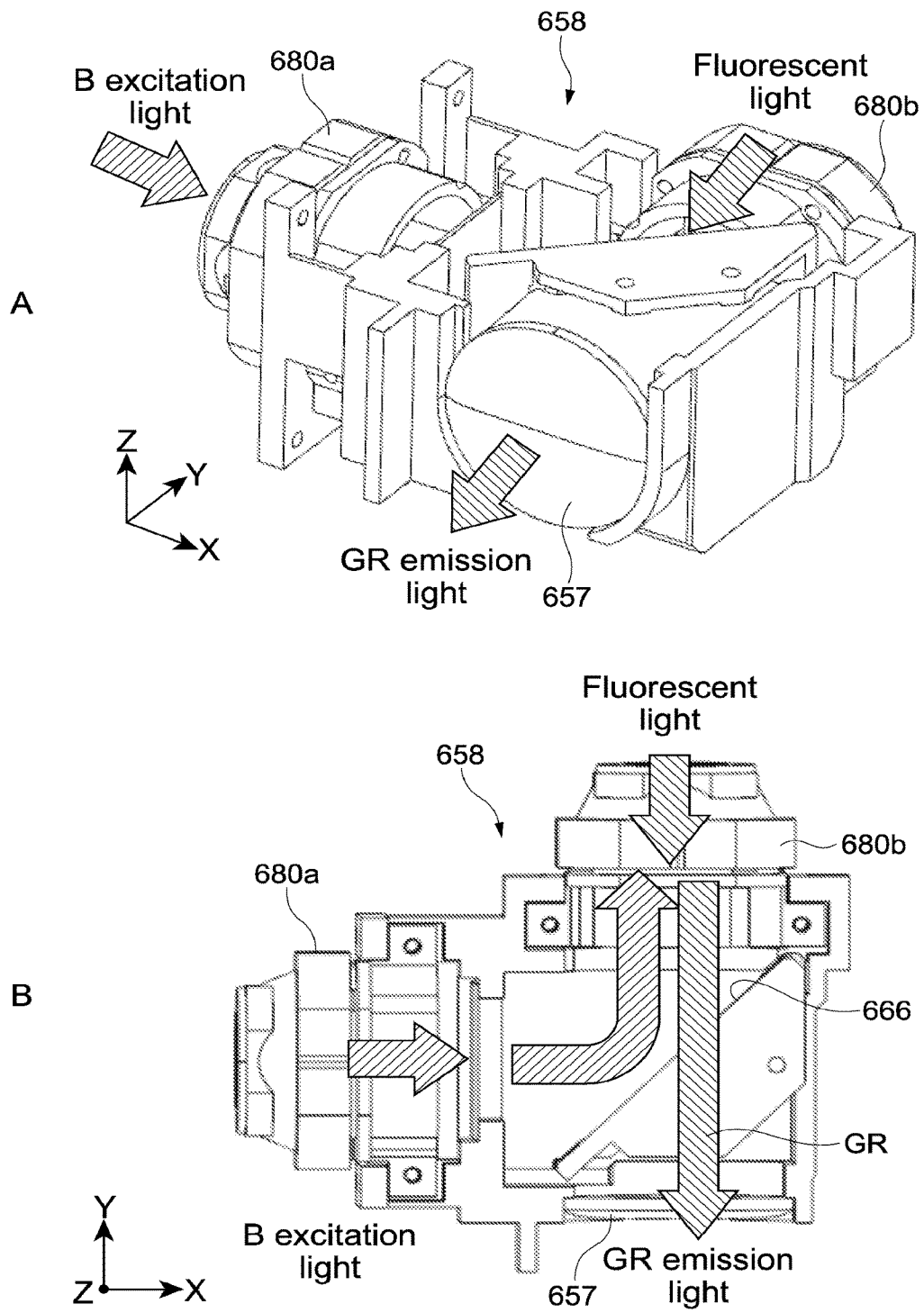
FIG. 14 Diagrams showing a configuration example of the lens holding portion of the GR light source module shown in FIG. 13.

FIG. 13 is a schematic diagram showing another configuration example of the GR light source module. FIG. 14 are schematic diagrams showing a configuration example of a lens holding portion of the GR light source module shown in FIG. 13. As shown in FIG. 13, in this GR light source module 650, a reflection-type phosphor wheel 660 is arranged so as to face the front side along the Y-axis direction.

So as to correspond to this, as shown in FIGS. 14A and 14B, a lens holding portion 658 is substantially L-shaped and includes a first end portion 680*a* where a light-incident side lens group is arranged and a second end portion 680*b* where light-emitting side lenses are arranged. A dichroic mirror 666 is arranged at a center portion of the bent lens holding portion 658.

The first end portion 680*a* is attached to the attachment aperture 68 of the mirror holding portion 56 shown in FIG. 8. At this time, the attachment is performed such that the second end portion 680*b* opposes the phosphor wheel 660. Blue laser light (B excitation light in figure) emitted from the attachment aperture 68 enters the dichroic mirror 666 via the light-incident side lens group.

The dichroic mirror 666 reflects incident B excitation light toward the light-emitting side lens group along the Y-axis direction. The reflected B excitation light enters the phosphor layer via the light-emitting side lens group. Yellow light GR (excitation light) is generated by excitation and is reflected toward the dichroic mirror 666. The dichroic mirror 666 transmits the yellow light GR toward an emission lens 657. The emission lens 657 emits the yellow light GR toward a reflective mirror 681 arranged in front.

As shown in FIG. 13, the reflective mirror 681 reflects the yellow light GR toward an emission mirror 659 arranged below. The emission mirror 659 reflects the yellow light GR to the front side along the optical axis L2. Accordingly, emission of the yellow light GR in the separation emission mode is realized.

By configuring the lens holding portion 658 in this way and replacing it with the lens holding portion 58 shown in FIG. 8 as appropriate, it becomes possible to easily cope with a position change of the phosphor wheel, a change of an optical path, and the like, for example. Further, since a common member can be used as the light-incident side lenses and light-emitting side lenses configuring the lens holding portion 658 and the lens holding portion 58, component costs can be suppressed. Moreover, mass productivity of a product can be improved.

The switch between the separation emission mode and the synthetic light emission mode can be easily realized by a change of a configuration of a portion where the reflective mirror 681 is arranged and a change of the optical axis position of the blue light B, for example. As described above, in the separation emission mode, the yellow light GR is emitted from the emission mirror 659 along the optical axis L2. The blue light B is emitted toward a reflective mirror 690 arranged above the reflective mirror 681 of the GR light source module 650 along the X-axis direction. The blue light B is reflected by this reflective mirror 690 along the optical axis L3.

In the synthetic light emission mode, a dichroic mirror (not shown) that transmits the yellow light GR along the optical axis L1 is arranged in front of the emission lens 657 of the GR light source module 650. This dichroic mirror is arranged obliquely toward the X-axis direction.

After an optical axis position is moved downwardly, the blue light B is emitted toward the dichroic mirror described above. The dichroic mirror reflects the blue light B along the optical axis L1. Accordingly, the yellow light GR and the blue light B are synthesized on the optical axis L1, and white light W is emitted along the optical axis L1. As in this embodiment, the configuration of each of the GR light source module and the B light source module may be set arbitrarily.

In the image display apparatuses 500 and 500' shown in FIGS. 1 and 2, a reflection-type liquid crystal panel is used as the image generation device. However, a transmission-type liquid crystal panel, a digital micromirror device (DMD), or the like may be used instead. In addition, the configuration of the image display apparatus may be set as appropriate.

The present technology is also applicable to other image display apparatuses such as display apparatuses other than a projector, for example. Moreover, the light source apparatus according to the present technology may be used in apparatuses that are not the image display apparatus.

At least two of the feature portions described above according to the present technology can be combined. In other words, the various feature portions described in the embodiments may be combined arbitrarily without distinguishing the embodiments from one another. Further, the various effects described above are mere examples and should not be limited thereto. In addition, other effects may also be exerted.

It should be noted that the present technology can also take the following configurations.

(1) A light source apparatus, including:
 a first light source module that emits first emission light; and
 a second light source module including
  a light source unit that generates second emission light, and
  a switch unit that switches a position of an emission optical axis of the second emission light generated by the light source unit between a first optical axis position for emitting synthetic light of the first emission light and the second emission light and a second optical axis position for separating the first emission light and the second emission light for emission.
(2) The light source apparatus according to (1), in which
 the first emission light includes a first wavelength range, and
 the second emission light includes a second wavelength range different from the first wavelength range and is light from which white light is generated when synthesized with the first emission light.
(3) The light source apparatus according to (1) or (2), in which
 the switch unit includes a first mirror that reflects the second emission light generated by the light source unit and a switch mechanism that switches a reflection direction of the first mirror, and switches a position of the emission optical axis by switching the reflection direction of the first mirror.
(4) The light source apparatus according to (3), in which
 the first mirror is arranged at the first optical axis position,
 the switch unit includes a second mirror that is arranged at the second optical axis position and reflects incident light in an emission direction of the second emission light, and
 the switch mechanism switches the reflection direction of the first mirror between the emission direction of the second emission light and a direction directed toward the second mirror.
(5) The light source apparatus according to any one of (1) to (4), in which
 the switch unit is a first switch unit, and
 the first light source module includes a second switch unit that switches a position of an emission optical axis of the first emission light between the first optical axis position and a third optical axis position for separating the first emission light and the second emission light for emission.
(6) The light source apparatus according to (5), in which
 the first light source module includes an outlet that is arranged at the third optical axis position and from which the first emission light is emitted, and
 the second switch unit includes an optical axis changing member detachably arranged in front of the outlet and switches the position of the emission optical axis by making a switch between attaching and detaching the optical axis changing member, the optical axis changing member emitting the first emission light emitted from the outlet in an emission direction of the first emission light from the first optical axis position.
(7) The light source apparatus according to (5) or (6), in which
 the second switch unit includes an optical axis movement mechanism that moves the position of the emission optical axis of the first emission light between the first optical axis position and the third optical axis position.
(8) The light source apparatus according to (7), in which
 the light source unit includes an emission lens that emits the second emission light, and
 the second switch unit causes the first emission light to enter the emission lens in a case where the position of the first emission optical axis is to be moved to the first optical axis position.

REFERENCE SIGNS LIST

B blue light
GR yellow light
W white light
L1 optical axis of white light
L2 optical axis of yellow light
L3 optical axis of blue light
10 B light source module
12 light source block 16 emission lens
17 lens holding portion
25 optical axis changing member
30 optical axis movement mechanism
50 GR light source module
57, 657 emission lens
58, 658 lens holding portion
59, 659 emission mirror
63 light source block
66, 666 dichroic mirror
100 light source apparatus
200, 200' image generation system
300, 300' projection system
500, 500' image display apparatus

The invention claimed is:

1. A light source apparatus, comprising:
a first light source that emits first emission light; and
a second light source including:
  a light emitter that emits second emission light, and
  a switch that switches an emission direction of the second emission light between a first optical axis direction, for emitting synthetic light of the first emission light and the second emission light along the first optical axis direction, by superimposing the first emission light at the exit of the first light source with the second emission light at the exit of the light emitter and having the first emission light and second emission light travel along the first optical axis direction, and a second optical axis direction for separating the first emission light and the second emission light for emission, wherein
the first emission light is emitted along the first optical axis direction parallel to an emission optical axis of the light source apparatus when the second emission light is emitted along the first optical axis direction parallel to the emission optical axis of the light source apparatus, and
the first emission light is emitted along a third optical axis direction parallel to the emission optical axis of the light source apparatus when the second emission light is emitted along the second optical axis direction parallel to the emission optical axis of the light source apparatus, wherein
the first optical axis direction, the second optical axis direction, the third optical axis direction and the emission optical axis are all parallel lines with respect to each other.

2. The light source apparatus according to claim 1, wherein
the first emission light includes a first wavelength range,
the second emission light includes a second wavelength range different from the first wavelength range, and
white light is generated when the second emission light is synthesized with the first emission light.

3. The light source apparatus according to claim 1, wherein
the switch includes a first mirror that reflects the second emission light emitted by the light emitter,
the switch switches a reflection direction of the first mirror, and
the switch switches the emission direction of the second emission light by switching the reflection direction of the first mirror.

4. The light source apparatus according to claim 3, wherein
the first mirror is arranged relative to the first optical axis direction,
the switch further includes a second mirror that is arranged relative to the second optical axis direction and reflects incident light in an emission direction of the second emission light, and
the switch switches the reflection direction of the first mirror between the emission direction of the second emission light and a direction toward the second mirror.

5. The light source apparatus according to claim 1, wherein
the switch is a first switch, and
the first light source includes a second switch that switches an emission direction of the first emission light between the first optical axis direction and the third optical axis direction for separating the first emission light and the second emission light for emission.

6. The light source apparatus according to claim 5, wherein
the first light source includes an outlet that is arranged along the third optical axis direction and from which the first emission light is emitted, and
the second switch includes an optical axis changing member detachably arranged in front of the outlet and that switches the direction of the emission optical axis by switching between attaching and detaching the optical axis changing member, the optical axis changing member emitting the first emission light emitted from the outlet in an emission direction of the first emission light along the first optical axis direction.

7. The light source apparatus according to claim 5, wherein
the second switch includes an optical axis movement mechanism that moves the emission direction of the first emission light between the first optical axis direction and the third optical axis direction.

8. The light source apparatus according to claim 7, wherein
the light emitter includes an emission lens that emits the second emission light, and
the second switch causes the first emission light to enter the emission lens in a case where the direction of the first emission optical axis is to be moved to the first optical axis direction.

9. The light source apparatus according to claim 1, further comprising:
an image generation system that generates an image based on the synthetic light emitted from the light source apparatus; and
a projection system that projects the image generated by the image generation system.

10. The light source apparatus according to claim 1, further comprising:
an image generation system that generates an image based on the first emission light and the second emission light that have been separated and emitted from the light source apparatus; and
a projection system that projects the image generated by the image generation system.

11. The light source apparatus according to claim 1, wherein
the first emission light has a wavelength that is lower than the second emission light.

12. A light source module, comprising:
a light source that generates light;
a mirror that reflects the light generated by the light source; and a switch that switches, by switching a reflection direction of the mirror, a direction of an emission optical axis of the light generated by the light source between a synthetic optical axis direction for emitting synthetic light synthesized with another light emitted from another light source along the synthetic optical axis direction, by superimposing the light at the exit of the light source with the another light at the exit of the another light source and having the superimposed light and the another light travel along the synthetic optical axis direction, and a separation optical axis direction for separating the light from the another light for emission, wherein the another light is emitted along the synthetic optical axis direction parallel to the emission optical axis of the light source module when the light is emitted along the synthetic optical axis direction parallel to the emission optical axis of the light source module, and the another light is emitted along another optical axis direction parallel to the emission optical axis of the light source module when the light is emitted along the separation optical axis direction parallel to the emission optical axis of the light source module, wherein the synthetic optical axis direction, the separation optical axis direction, the another optical axis direction and the emission optical axis are all parallel lines with respect to each other.

13. A light source module, comprising:

an outlet that is arranged along a separation optical axis direction for separating light from another light emitted from another light source module for emission, and emits the light in an emission direction; and a switch that includes an optical axis changing member detachably arranged in front of the outlet and switches a direction of an emission optical axis of the light emitted from the outlet by making a switch between attaching and detaching the optical axis changing member, the optical axis changing member emitting the light emitted from the outlet in the emission direction from a synthetic optical axis direction for emitting synthetic light synthesized with the another light along the synthetic optical axis direction, by superimposing the light at the exit of the outlet with the another light at the exit of the another light source and having the light and the another light travel along the synthetic optical axis direction, wherein the another light is emitted along the synthetic optical axis direction parallel to the emission optical axis of the light source module when the light is emitted along the synthetic optical axis direction parallel to the emission optical axis of the light source module, and the another light is emitted along another optical axis direction parallel to the emission optical axis of the light source module when the light is emitted along the separation optical axis direction parallel to the emission optical axis of the light source module, wherein the synthetic optical axis direction, the separation optical axis direction, the another optical axis direction and the emission optical axis are all parallel lines with respect to each other.

14. A light source module, comprising:

an outlet from which light is emitted; and an optical axis movement mechanism that moves a direction of an emission optical axis of the light between a separation optical axis direction for separating the light from another light emitted from another light source module for emission and a synthetic optical axis direction for emitting synthetic light synthesized with the another light along the synthetic optical axis direction, by superimposing the light at the exit of the outlet with the another light at the exit of the another light source and having the light and the another light travel along the synthetic optical axis direction, wherein the another light is emitted along the synthetic optical axis direction parallel to the emission optical axis of the light source module when the light is emitted along the synthetic optical axis direction parallel to the emission optical axis of the light source module, and the another light is emitted along another optical axis direction parallel to the emission optical axis of the light source module when the light is emitted along the separation optical axis direction parallel to the emission optical axis of the light source module, wherein the synthetic optical axis direction, the separation optical axis direction, the another optical axis direction and the emission optical axis are all parallel lines with respect to each other.

\* \* \* \* \*